United States Patent
Hays et al.

(10) Patent No.: US 6,782,325 B2
(45) Date of Patent: Aug. 24, 2004

(54) PROGRAMMABLE CORIOLIS FLOW METER ELECTRONICS FOR OUTPUTTING INFORMATION OVER A SINGLE OUTPUT PORT

(75) Inventors: Paul J. Hays, Lafayette, CO (US); William Michael Mansfield, Lafayette, CO (US)

(73) Assignee: Micro Motion, Inc., Boulder, CO (US)

( * ) Notice: Subject to any disclaimer, the term of this patent is extended or adjusted under 35 U.S.C. 154(b) by 63 days.

(21) Appl. No.: 10/261,057

(22) Filed: Sep. 30, 2002

(65) Prior Publication Data

US 2004/0064271 A1 Apr. 1, 2004

(51) Int. Cl.[7] .............................................. G06F 19/00
(52) U.S. Cl. ...................... 702/45; 702/54; 73/861.354; 73/861.351; 73/861.357
(58) Field of Search ...................... 73/861.354, 861.351, 73/861.357; 702/45, 54, 104

(56) References Cited

U.S. PATENT DOCUMENTS

| | | |
|---|---|---|
| 4,872,351 A | 10/1989 | Ruesch |
| 6,351,691 B1 | 2/2002 | Mansfield |

FOREIGN PATENT DOCUMENTS

EP    1182433 A2    2/2002

OTHER PUBLICATIONS

"Coriolis Mass Flow Measuring System promass 40 E", Endress and Hauser, 2003.*

* cited by examiner

*Primary Examiner*—John Barlow
*Assistant Examiner*—Stephen S. Cherry
(74) *Attorney, Agent, or Firm*—Duft Setter Ollila & Bornsen LLC

(57) ABSTRACT

Flow meter electronics are described for providing a flow rate of a material flowing through a flow meter sensor of a Coriolis flow meter. The flow meter electronics comprise a processing system and a single output port. The processing system receives pick-off signals from the flow meter sensor and processes the pick-off signals to determine the flow rate. The processing system receives an instruction for a frequency output signal or a digital communication protocol signal. If the instruction is for a frequency output signal, then the processing system processes the flow rate to generate a frequency output signal and transmits the frequency output signal over the single output port. If the instruction is for a digital communication protocol signal, then the processing system processes the flow rate to generate a digital communication protocol signal and transmits the digital communication protocol signal over the single output port.

21 Claims, 5 Drawing Sheets

PROGRAMMABLE CORIOLIS FLOW METER ELECTRONICS FOR OUTPUTTING INFORMATION OVER A SINGLE OUTPUT PORT

BACKGROUND OF THE INVENTION

1. Field of the Invention

The invention is related to the field of flow meters, and in particular, to flow meter electronics capable of outputting either a frequency output signal or a digital communication protocol signal over a single output port.

2. Statement of the Problem

Coriolis mass flow meters measure mass flow and other information with respect to materials flowing through a pipeline as disclosed in U.S. Pat. No. 4,491,025 issued to J. E. Smith, et al., of Jan. 1, 1985 and U.S. Pat. No. Re. 31,450 to J. E. Smith of Feb. 11, 1982. These flow meters typically comprise a flow meter electronics portion and a flow meter sensor portion. Flow meter sensors have one or more flow tubes of a straight or curved configuration. Each flow tube configuration has a set of natural vibration modes, which may be of a simple bending, torsional, radial, or coupled type. Each flow tube is driven to oscillate at resonance in one of these natural vibration modes. The natural vibration modes of the vibrating, material filled systems are defined in part by the combined mass of the flow tubes and the material within the flow tubes. When there is no material flowing through a Coriolis flow meter sensor, all points along the flow tubes oscillate with a substantially identical phase. As material flows through the flow tubes, Coriolis accelerations cause points along the flow tubes to have a different phase. The phase on the inlet side of the flow meter sensor lags the driver, while the phase on the outlet side of the flow meter sensor leads the driver.

Coriolis flow meter sensors typically include two pick-offs for producing sinusoidal signals representative of the motion of the flow tubes at different points along the flow tubes. A phase difference of the sinusoidal signals received from the pick-offs is calculated by the flow meter electronics. The phase difference between the pick-off signals is proportional to the mass flow rate of the material flowing through the flow meter sensor. An example of a Coriolis flow meter is described below in FIG. 1.

The flow meter electronics receive the pick-off signals from the pick-offs. The flow meter electronics process the pick-off signals to compute a mass flow rate, a density, or another property of the material passing through the flow meter sensor. The flow meter electronics typically have multiple output ports or multiple communication channels for outputting the mass flow rate, the density, or other information. For instance, typical flow meter electronics have a milliamp output, a discreet voltage output, a digital communications protocol output, and a frequency output. Each output has its own physical port. The flow meter electronics with multiple output ports provide a great deal of versatility to users, which can be useful for certain applications. Unfortunately, flow meter electronics with multiple output ports can be expensive and may have more functionality than is needed for simple applications.

To help solve this problem, less complex and cheaper flow meter electronics have been developed. The less complex flow meter electronics still receive the pick-off signals from the pick-offs, and process the pick-off signals to compute a mass flow rate, a density, or another property of the material passing through the flow meter sensor. The less complex flow meter electronics differ by having a single output port. The less complex flow meter electronics only generate a digital communication protocol signal that represents the mass flow rate, the density, or the other properties. Unfortunately, some users have legacy systems that are configured to receive a frequency or pulse signal and do not understand a digital communication protocol signal.

Traditionally, the flow meter industry mainly involves mechanical flow meters, such as positive displacement meters, oval gear, or turbine flow meters. These mechanical flow meters generate a pulse signal when the chamber, gear, or blade passes through a magnetic field, or from a magnetic rotating component on a shaft. Legacy systems receive the pulse signal and provide a read out of the flow rate, adjust a valve based on the flow rate, or perform another function. Newer electronic flow meters have also been configured to generate a pulse signal proportional to a flow rate to interface with these legacy systems. Unfortunately, no flow meter electronics have been developed that will interface with legacy systems and current flow systems, but are cost effective for less complex applications.

SUMMARY OF THE SOLUTION

The invention helps solve the above problems with flow meter electronics that can be programmed to either output a frequency output signal or a digital communication protocol signal over a single output port. The invention advantageously provides flow meter electronics that are cheaper and better suited for less complex applications. The flow meter electronics are also capable of interfacing with legacy systems with the frequency output signal or interfacing with more modern systems with the digital communication protocol signal.

One embodiment of the invention includes flow meter electronics for providing a flow rate of a material flowing through a flow meter sensor of a Coriolis flow meter. The flow meter electronics comprise a processing system and a single output port. The processing system receives pick-off signals from the flow meter sensor and processes the pick-off signals to determine the flow rate of the material. The processing system receives an instruction for a frequency output signal or a digital communication protocol signal. If the instruction is for a frequency output signal, then the processing system processes the flow rate to generate a frequency output signal having a frequency proportional to the flow rate, and transmits the frequency output signal over the single output port. If the instruction is for a digital communication protocol signal, then the processing system processes the flow rate to generate a digital communication protocol signal that represents the flow rate, and transmits the digital communication protocol signal over the single output port.

In another embodiment, the processing system determines a direction of flow of the material. If the direction of flow is in a forward direction, then the processing system generates the frequency output signal to have a duty cycle below 0.5. If the direction of flow is in a reverse direction, then the processing system generates the frequency output signal to have a duty cycle above 0.5.

In another embodiment of the invention, the processing system determines if a fault has occurred. The processing system generates the frequency output signal having a predetermined frequency responsive to determining the fault.

The invention also includes other embodiments described below.

The following depict aspects of the invention. One aspect is flow meter electronics for providing a flow rate of a material flowing through a flow meter sensor of a Coriolis flow meter, said flow meter electronics comprising:

a single output port; and a processing system coupled to said single output port and configured to:

receive pick-off signals from said flow meter sensor, process said pick-off signals to determine said flow rate of said material, receive an instruction for a frequency output signal or a digital communication protocol signal, if said instruction is for said frequency output signal, then said processing system is further configured to process said flow rate to generate said frequency output signal having a frequency proportional to said flow rate, and transmit said frequency output signal over said single output port, and if said instruction is for said digital communication protocol signal, then said processing system is further configured to process said flow rate to generate said digital communication protocol signal that represents said flow rate, and transmit said digital communication protocol signal over said single output port.

Preferably, the processing system is further configured to:

determine a direction of flow of said material;

if said direction of flow is in a first direction, then generate said frequency output signal to have a duty cycle below 0.5; and if said direction of flow is in a second direction, then generate said frequency output signal to have a duty cycle above 0.5.

Preferably, the processing system is further configured to:

determine if a fault has occurred; and generate said frequency output signal having a predetermined frequency responsive to determining said fault.

Preferably, the processing system is further configured to receive said instruction over said single output port from a user.

Preferably, the flow rate comprises a mass flow rate.

Alternatively, the flow rate comprises a volumetric flow rate.

Alternatively, the flow rate comprises a net volumetric flow rate.

Another aspect is a method of operating flow meter electronics for providing a flow rate of a material flowing through a flow meter sensor of a Coriolis flow meter, said method comprising the steps of:

receiving pick-off signals from said flow meter sensor;

processing said pick-off signals to determine said flow rate of said material;

receiving an instruction for a frequency output signal or a digital communication protocol signal;

if said instruction is for a frequency output signal, then processing said flow rate to generate said frequency output signal having a frequency proportional to said flow rate and transmitting said frequency output signal over a single output port; and if said instruction is for said digital communication protocol signal, then processing said flow rate to generate said digital communication protocol signal that represents said flow rate and transmitting said digital communication protocol signal over said single output port.

Preferably, the method further comprises:

determining a direction of flow of said material;

if said direction of flow is in a first direction, then generating said frequency output signal to have a duty cycle below 0.5; and if said direction of flow is in a second direction, then generating said frequency output signal to have a duty cycle above 0.5.

Preferably, the method further comprises:

determining if a fault has occurred; and generating said frequency output signal having a predetermined frequency responsive to determining said fault.

Preferably, the method further comprises receiving said instruction over said single output port from a user.

Preferably, the flow rate comprises a mass flow rate.

Alternatively, the flow rate comprises a volumetric flow rate.

Alternatively, the flow rate comprises a net volumetric flow rate.

Another aspect is a software product for providing a flow rate of a material flowing through a flow meter sensor of a Coriolis flow meter, said software product comprising:

flow meter software configured when executed by a processing system to direct the processing system to receive pick-off signals from said flow meter sensor, process said pick-off signals to determine said flow rate of said material, receive an instruction for a frequency output signal or a digital communication protocol signal, process said flow rate to generate said frequency output signal having a frequency proportional to said flow rate and transmit said frequency output signal over a single output port if said instruction is for said frequency output signal, and process said flow rate to generate said digital communication protocol signal that represents said flow rate and transmit said digital communication protocol signal over said single output port if said instruction is for said digital communication protocol signal; and a storage media configured to store said flow meter software.

Preferably, the flow meter software is further configured to direct said processing system to:

determine a direction of flow of said material;

if said direction of flow is in a first direction, then generate said frequency output signal to have a duty cycle below 0.5; and if said direction of flow is in a second direction, then generate said frequency output signal to have a duty cycle above 0.5.

Preferably, the flow meter software is further configured to direct said processing system to:

determine if a fault has occurred; and generate said frequency output signal having a predetermined frequency responsive to determining said fault.

Preferably, the flow meter software is further configured to direct said processing system to receive said instruction over said single output port from a user.

Preferably, the flow rate comprises a mass flow rate.

Alternatively, the flow rate comprises a volumetric flow rate.

Alternatively, the flow rate comprises a net volumetric flow rate.

DESCRIPTION OF THE DRAWINGS

The same reference number represents the same element on all drawings.

DETAILED DESCRIPTION OF THE INVENTION

FIGS. 1–5 and the following description depict specific examples of flow meter electronics to teach those skilled in the art how to make and use the best mode of the invention. For the purpose of teaching inventive principles, some conventional aspects of the flow meter electronics have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
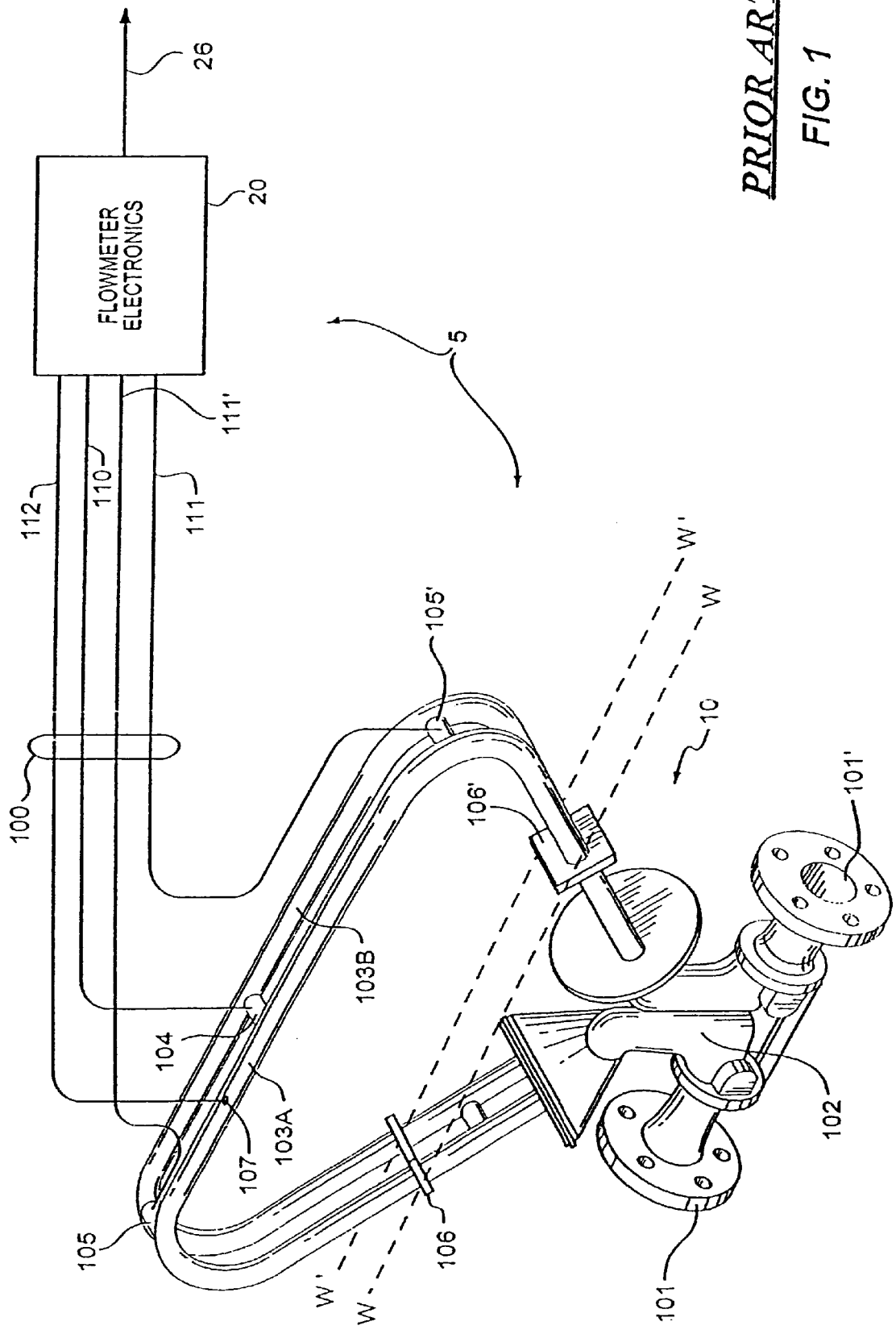
FIG. 1 illustrates a Coriolis flow meter in the prior art.
Figure 2:
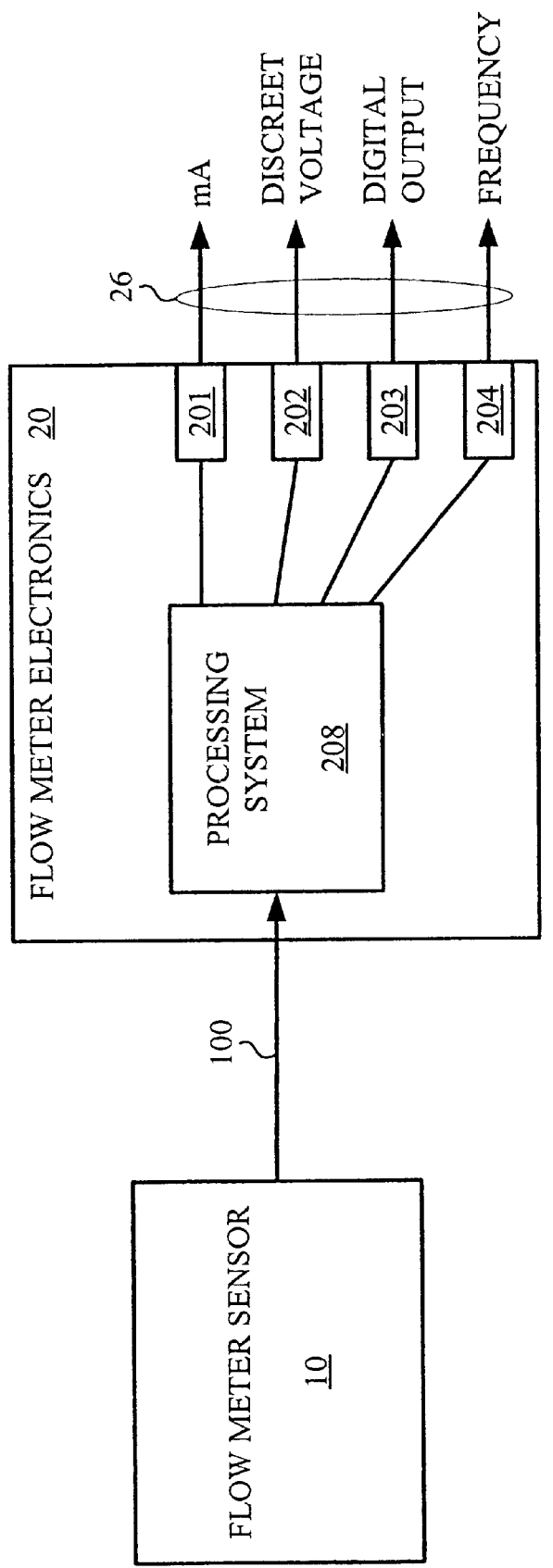
FIG. 2 illustrates flow meter electronics having multiple output ports in the prior art.

Prior Art Coriolis Flow Meter—FIGS. 1–2

FIG. 1 illustrates a Coriolis flow meter 5 in the prior art. Coriolis flow meter 5 comprises a Coriolis flow meter sensor 10 and Coriolis flow meter electronics 20. Flow meter electronics 20 is connected to flow meter sensor 10 via path 100 to provide for mass flow rate, density, volume flow rate, totalized mass flow information, and other information over path 26. Path 26 represents multiple output ports carrying information on multiple channels of communications as is depicted in FIG. 2. A variety of commercially available Coriolis flow meters providing these measurements may be purchased from Micro Motion of Boulder, Colo.

Flow meter sensor 10 includes a pair of flanges 101 and 101', manifold 102, and flow tubes 103A and 103B. Connected to flow tubes 103A and 103B are driver 104 and pick-off sensors 105 and 105', and temperature sensor 107. Brace bars 106 and 106' serve to define the axis W and W' about which each flow tube 103A and 103B oscillates.

When flow meter sensor 10 is inserted into a pipeline system (not shown in FIG. 1) which carries a material that is being measured, the material enters flow meter sensor 10 through flange 101, passes through manifold 102 where the material is directed to enter flow tubes 103A and 103B, flows through flow tubes 103A and 103B and back into manifold 102 from where it exits flow meter sensor 10 through flange 101'.

Flow tubes 103A and 103B are selected and appropriately mounted to the manifold 102 to have substantially the same mass distribution, moments of inertia, and elastic modules about bending axes W-W and W'-W', respectively. The flow tubes 103A–103B extend outwardly from manifold 102 in an essentially parallel fashion.

Flow tubes 103A–103B are driven by driver 104 in opposite directions about their respective bending axes W and W' at what is termed the first out of phase bending mode of the flow meter. Driver 104 may comprise any one of many well known arrangements, such as a magnet mounted to flow tube 103A and an opposing coil mounted to flow tube 103B and through which an alternating current is passed for vibrating both flow tubes. A suitable drive signal is applied by flow meter electronics 20, via lead 110, to driver 104. Pick-off sensors 105 and 105' are affixed to at least one of flow tubes 103A and 103B on opposing ends of the flow tube to measure oscillation of the flow tubes. As flow tubes 103A–103B vibrate, pick-off sensors 105–105' generate a first pick-off signal and a second pick-off signal. The first and second pick-off signals are applied to leads 111 and 111'.

Temperature sensor 107 is affixed to at least one of flow tubes 103A and 103B. Temperature sensor 107 measures the temperature of the flow tube in order to modify equations for the temperature of the system. Path 112 carries temperature signals from temperature sensor 107 to flow meter electronics 20.

Flow meter electronics 20 receive the first and second pick-off signals appearing on leads 111 and 111', respectively. Flow meter electronics 20 process the first and second pick-off signals to compute the mass flow rate, the density, or other property of the material passing through flow meter sensor 10. This computed information is applied by meter electronics 20 over path 26 to a utilization means (not shown in FIG. 1).

FIG. 2 illustrates flow meter electronics 20 having multiple output ports 201–204 in the prior art. In FIG. 2, flow meter sensor 10 is depicted in block diagram form for the sake of simplicity. Flow meter electronics 20 comprises processing system 208 and output ports 201–204. Output ports 201–204 make up path 26 in FIG. 1. Processing system 208 outputs different types of signals over output ports 201–204. Processing system 208 outputs a milliamp signal over output port 201. Processing system 208 outputs a discreet voltage signal over output port 202. Processing system 208 outputs a digital communication protocol signal over output port 203. Processing system 208 outputs a frequency signal or pulse signal over output port 204. Unfortunately, flow meter electronics 20 with multiple output ports 201–204 can be expensive and may have more functionality than is needed for simple applications.

There also exists other prior art flow meter electronics that are simpler and lower-cost than flow meter electronics 20. The flow meter electronics have only one output port, such as output port 203, that outputs a digital communication protocol signal. One problem with these types of flow meter electronics is that they can only output a digital communication protocol signal and some legacy systems do not understand a digital communication protocol signal.

Figure 3:
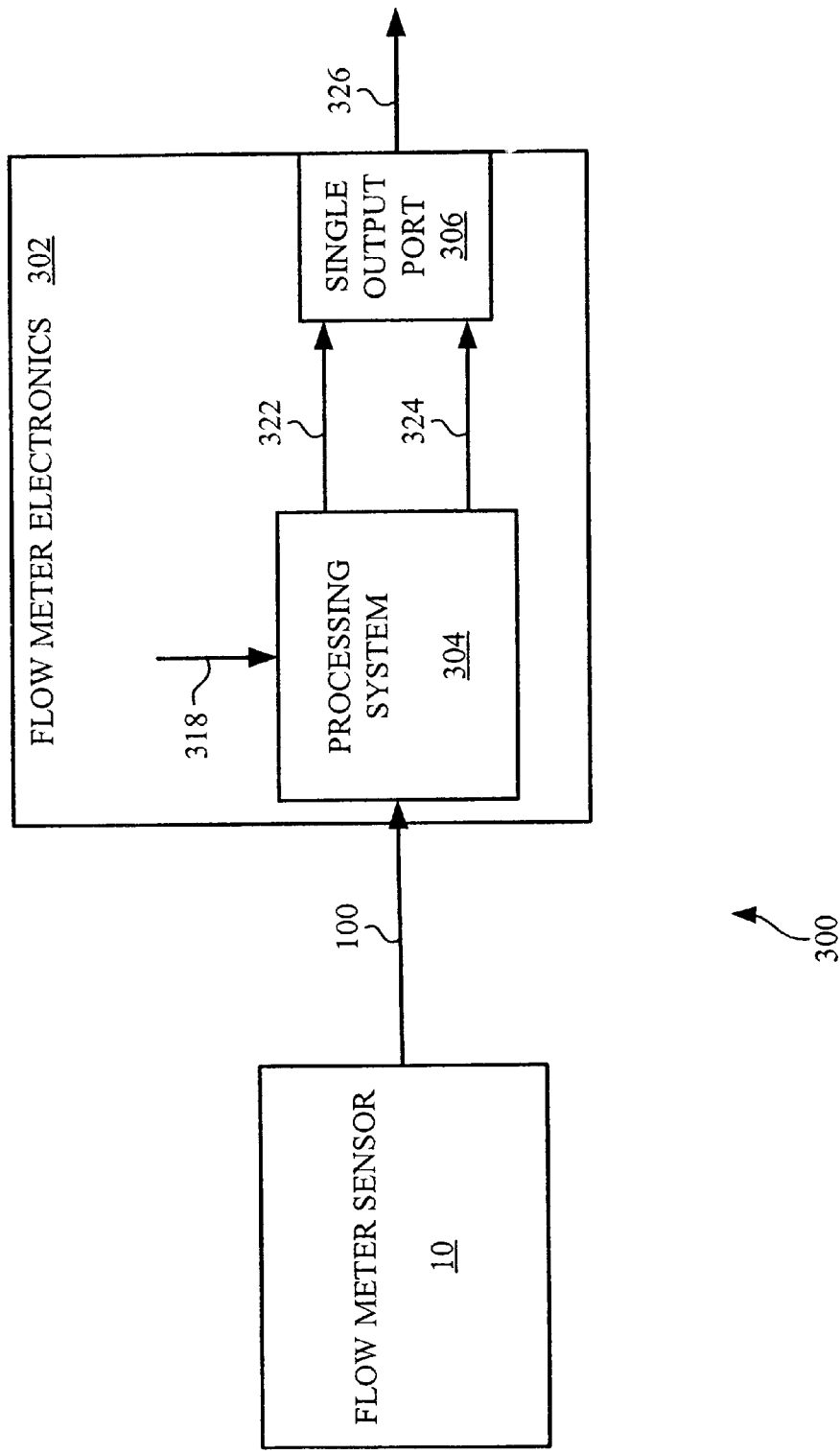
FIG. 3 illustrates flow meter electronics for a Coriolis flow meter in an example of the invention.

Flow Meter Electronics—FIG. 3

FIG. 3 illustrates flow meter electronics 302 for a Coriolis flow meter 300 in an example of the invention. Coriolis flow meter 300 is illustrated in block diagram form for simplicity. Flow meter electronics 302 is coupled to flow meter sensor 10 over path 100. Flow meter electronics 302 is comprised of processing system 304 coupled to a single output port 306. Single output port 306 provides a single channel of communications out of flow meter electronics 302. Flow meter electronics 302 may have one or more power connections (not shown) in addition to single output port 306.

Flow meter sensor 10 operates as described in FIG. 1 to transmit pick-off signals to flow meter electronics 302 over path 100 as a material flows through flow meter sensor 10. Flow meter sensor 10 could also transmit other signals, such as a temperature signal, to flow meter electronics 302. Processing system 304 receives the pick-off signals from flow meter sensor 10. Processing system 304 processes the pick-off signals to determine a flow rate of the material flowing through flow meter sensor 10.

Processing system 304 also receives an instruction 318 for a frequency output signal or a digital communication protocol signal. The frequency output signal comprises any signal that represents a single property of a material flowing through a flow meter sensor, such as a square wave signal or a sinusoidal signal. The frequency of the frequency output signal represents a property of a material flowing through a flow meter sensor. For instance, a frequency output signal may represent a mass flow rate, wherein the frequency of the frequency output signal is proportional to the mass flow rate. A digital communication protocol signal comprises any signal, that represents multiple properties of a material flowing through a flow meter sensor, that can be read by conventional digital processing circuitry. For instance, a digital communication protocol signal may represent a mass flow rate, a density, and other properties. Instruction 318 could be transmitted to flow meter electronics 302 by a user who is programming flow meter electronics 302.

If instruction 318 is for a frequency output signal, then processing system 304 processes the flow rate to generate a frequency output signal 322. Frequency output signal 322 has a frequency proportional to the flow rate of the material. Processing system 304 transmits frequency output signal 322 over single output port 306.

If instruction 318 is for a digital communication protocol signal, then processing system 304 processes the flow rate to generate a digital communication protocol signal 324. Digital communication protocol signal 324 represents the flow rate of the material. Processing system 304 transmits digital communication protocol signal 324 over single output port 306. Signal 326 represents either frequency output signal 322 or digital communication protocol signal 324, depending on which signal that processing system 304 transmitted over single output port 306. Based on this disclosure, those skilled in the art will appreciate how to modify existing flow meter electronics to make flow meter electronics 302.

Flow meter electronics 302 is advantageously less expensive to build and simpler to operate than flow meter electronics having multiple output ports. At the same time, flow meter electronics 302 provides flexibility to a user by allowing the user to program flow meter electronics 302 to output either a frequency output signal 322 or a digital communication protocol signal 324.

In one embodiment of the invention, processing system 304 determines a direction of flow of the material. If the direction of flow is in a forward direction, then processing system 304 generates frequency output signal 322 to have a duty cycle below 0.5. If the direction of flow is in a reverse direction, then processing system 304 generates frequency output signal 322 to have a duty cycle above 0.5.

In another embodiment, processing system 304 determines if a fault has occurred. The fault may have occurred in flow meter sensor 10, flow meter electronics 302, or in the pipeline (not shown) connected to flow meter sensor 10. Processing system 304 generates frequency output signal 322 having a predetermined frequency responsive to determining the fault.

In another embodiment of the invention, the above-described flow meter electronics 302 may be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Figure 4:
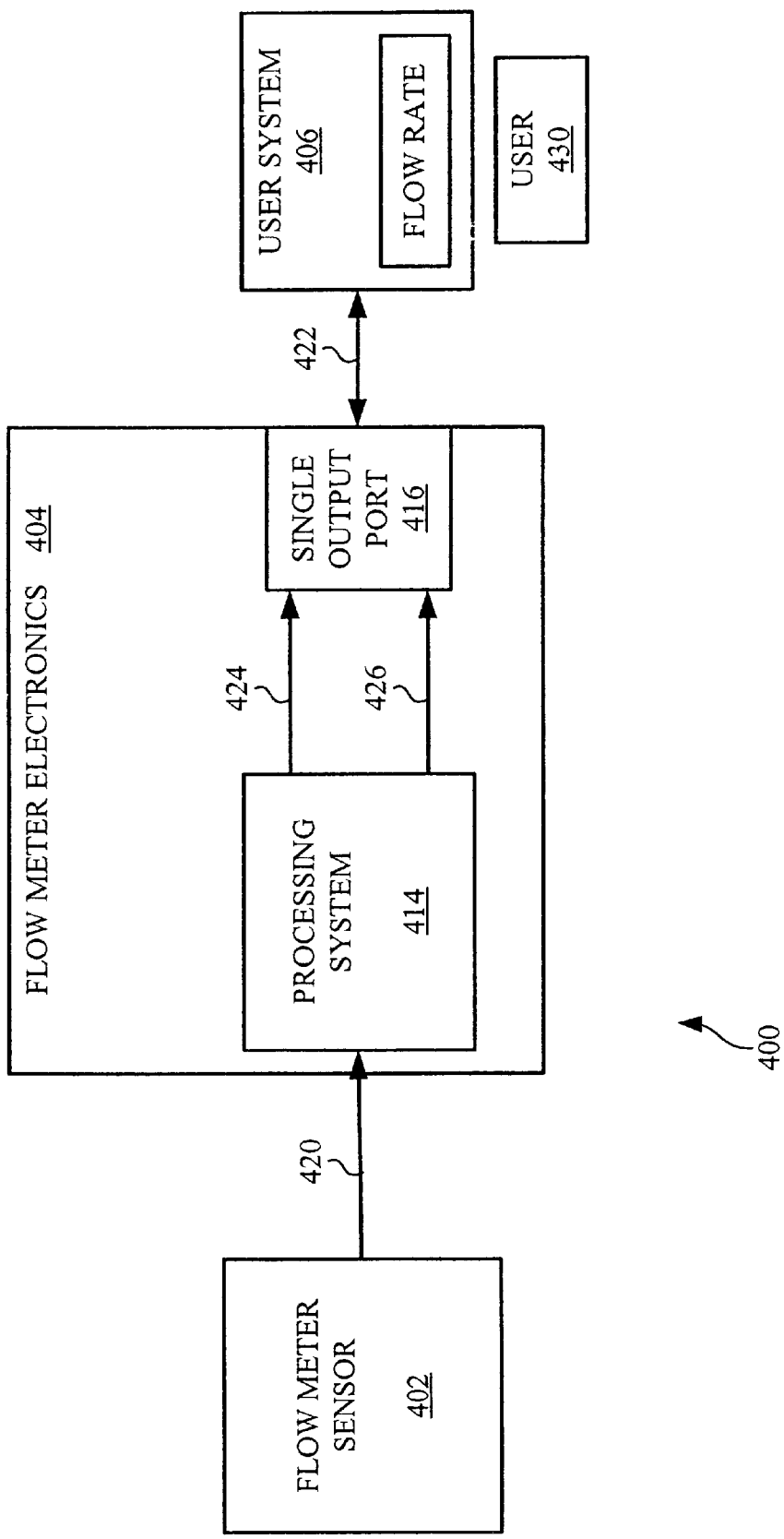
FIG. 4 illustrates an example of a Coriolis flow meter connected to a user system in an example of the invention.
Figure 5:
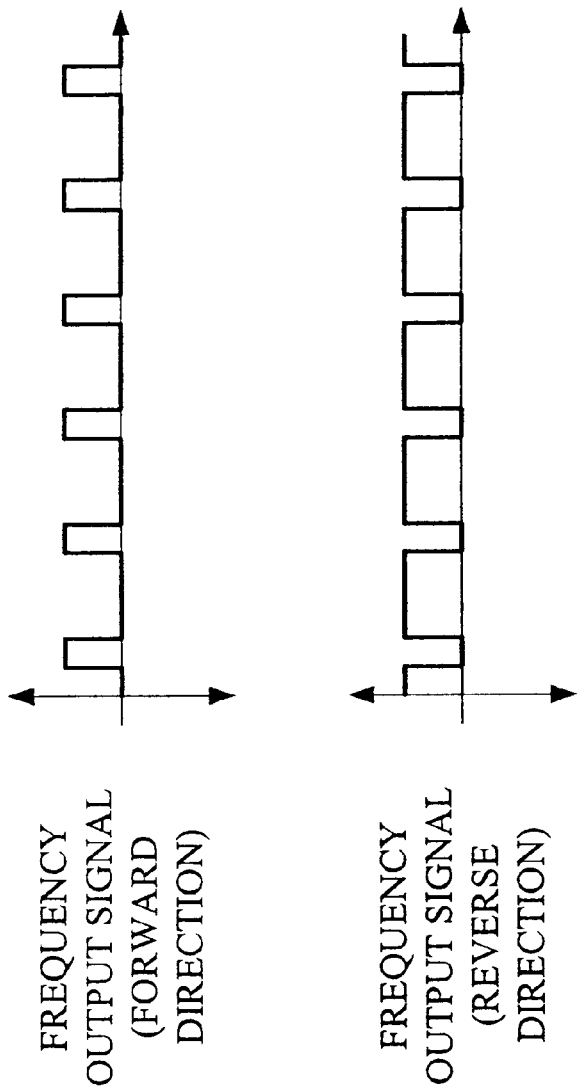
FIG. 5 illustrates frequency output signals in an example of the invention.

Example of Flow Meter Electronics—FIGS. 4–5

FIG. 4 illustrates an example of a Coriolis flow meter 400 connected to a user system 406 in an example of the invention. Flow meter electronics 404 is coupled to flow meter sensor 402 over path 420. Flow meter electronics 404 is coupled to user system 406 over path 422. Flow meter electronics 404 is comprised of processing system 414 coupled to a single output port 416.

Flow meter electronics 404 is configured to output a frequency output signal or a digital communication protocol signal. A user 430 can program flow meter electronics 404 to output the frequency output signal or the digital communication protocol signal with user system 406. User system 406 could be a computer, a display, or any other system or apparatus that interfaces user 430 with flow meter electronics 404.

On power up, single output port 416 acts as an input/output port for a time period, such as 5 seconds. Single output port 416 also acts as an input/output port for a time period after a power cycle. During this time period, processing system 414 waits for digital signals received over single output port 416. User 430 can program flow meter electronics 404 to operate in frequency mode or digital mode, select other operating options, or transmit operating parameters or other information to flow meter electronics 404 by transmitting instructions to flow meter electronics 404. Frequency mode means that flow meter electronics 404 outputs a frequency output signal. Digital mode means that flow meter electronics 404 outputs a digital communication protocol signal.

Following the time period after power up, processing system 414 operates in either frequency mode or digital mode. The operating mode can be a default programmed into processing system 414 or be programmed by user 430.

In frequency mode, processing system 414 receives the pick-off signals from flow meter sensor 402 and processes the pick-off signals to determine a flow rate of the material flowing through flow meter sensor 402. The flow rate may represent a mass flow rate, a volumetric flow rate, or a net volumetric flow rate. Processing system 414 generates frequency output signal 424 based on the flow rate of the material. Frequency output signal 424 has a frequency proportional to the flow rate of the material. Frequency output signal 424 may be scalable to 10,000 Hz.

Processing system 414 also determines a direction of flow of the material flowing through flow meter sensor 402. Processing system 414 generates frequency output signal 424 based on the direction of flow of the material. If the direction of flow is in a forward direction, then frequency output signal 424 has a duty cycle below 0.5. If the direction of flow is in a reverse direction, then frequency output signal 424 has a duty cycle above 0.5. Examples of frequency output signal 424 are depicted in FIG. 5. Processing system 414 transmits frequency output signal 424 to single output port 416.

Processing system 414 also determines if a fault has occurred. If a fault has occurred, processing system 414 generates frequency output signal 424 to have a fixed, high frequency. Processing system 414 operates in frequency mode until a power cycle occurs.

In digital mode, processing system 414 receives the pick-off signals from flow meter sensor 402 and processes the pick-off signals to determine the flow rate of the material flowing through flow meter sensor 402. Processing system 414 generates digital communication protocol signal 426 based on the flow rate of the material. Digital communication protocol signal 426 represents the flow rate of the material. Processing system 414 operates in digital mode until a power cycle occurs.

In digital mode, processing system 414 can also determine a direction of flow of the material flowing through flow meter sensor 402 and determine if a fault has occurred. Processing system 414 outputs digital communication protocol signal 426 representing the direction of flow of the material or fault information.

What is claimed is:

1. Flow meter electronics for providing a flow rate of a material flowing through a flow meter sensor of a Coriolis flow meter, said flow meter electronics comprising:

a single output port; and a processing system coupled to said single output port and configured to:

receive pick-off signals from said flow meter sensor, process said pick-off signals to determine said flow rate of said material, receive an instruction for a frequency output signal or a digital communication protocol signal, if said instruction is for said frequency output signal, then said processing system is configured to process said flow rate to generate said frequency output signal having a frequency proportional to said flow rate, and transmit said frequency output signal over said single output port, and if said instruction is for said digital communication protocol signal, then said processing system is configured to process said flow rate to generate said digital communication protocol signal that represents said flow rate, and transmit said digital communication protocol signal over said single output port.

2. The flow meter electronics of claim 1 wherein said processing system is further configured to:

determine a direction of flow of said material;

if said direction of flow is in a first direction, then generate said frequency output signal to have a duty cycle below 0.5; and if said direction of flow is in a second direction, then generate said frequency output signal to have a duty cycle above 0.5.

3. The flow meter electronics of claim 1 wherein said processing system is further configured to:

determine if a fault has occurred; and generate said frequency output signal to have a predetermined frequency responsive to determining said fault.

4. The flow meter electronics of claim 1 wherein said processing system is further configured to:

receive said instruction over said single output port from a user after a power cycle, wherein said single output port acts as an input/output port for a time period after said power cycle.

5. The flow meter electronics of claim 1 wherein said flow rate comprises a mass flow rate.

6. The flow meter electronics of claim 1 wherein said flow rate comprises a volumetric flow rate.

7. The flow meter electronics of claim 1 wherein said flow rate comprises a net volumetric flow rate.

8. A method of operating flow meter electronics for providing a flow rate of a material flowing through a flow meter sensor of a Coriolis flow meter, said method comprising the steps of:

receiving pick-off signals from said flow meter sensor;

processing said pick-off signals to determine said flow rate of said material;

receiving an instruction for a frequency output signal or a digital communication protocol signal;

if said instruction is for said frequency output signal, then processing said flow rate to generate said frequency output signal having a frequency proportional to said flow rate and transmitting said frequency output signal over a single output port; and if said instruction is for said digital communication protocol signal, then processing said flow rate to generate said digital communication protocol signal that represents said flow rate and transmitting said digital communication protocol signal over said single output port.

9. The method of claim 8 further comprising:

determining a direction of flow of said material;

if said direction of flow is in a first direction, then generating said frequency output signal to have a duty cycle below 0.5; and if said direction of flow is in a second direction, then generating said frequency output signal to have a duty cycle above 0.5.

10. The method of claim 8 further comprising:

determining if a fault has occurred; and generating said frequency output signal to have a predetermined frequency responsive to determining said fault.

11. The method of claim 8 wherein receiving an instruction for said frequency output signal or a digital communication protocol signal comprises:

receiving said instruction over said single output port from a user after a power cycle, wherein said single output port acts as an input/output port for a time period after said power cycle.

12. The method of claim 8 wherein said flow rate comprises a mass flow rate.

13. The method of claim 8 wherein said flow rate comprises a volumetric flow rate.

14. The method of claim 8 wherein said flow rate comprises a net volumetric flow rate.

15. A software product for providing a flow rate of a material flowing through a flow meter sensor of a Coriolis flow meter, said software product comprising:

flow meter software configured when executed by a processing system to direct the processing system to receive pick-off signals from said flow meter sensor, process said pick-off signals to determine said flow rate of said material, receive an instruction for a frequency output signal or a digital communication protocol signal, process said flow rate to generate said frequency output signal having a frequency proportional to said flow rate and transmit said frequency output signal over a single output port if said instruction is for said frequency output signal, and process said flow rate to generate said digital communication protocol signal that represents said flow rate and transmit said digital communication protocol signal over said single output port if said instruction is for said digital communication protocol signal; and a storage media configured to store said flow meter software.

16. The software product of claim 15 wherein said flow meter software is further configured to direct said processing system to:

determine a direction of flow of said material;
if said direction of flow is in a first direction, then generate said frequency output signal to have a duty cycle below 0.5; and
if said direction of flow is in a second direction, then generate said frequency output signal to have a duty cycle above 0.5.

17. The software product of claim 15 wherein said flow meter software is further configured to direct said processing system to:
determine if a fault has occurred; and
generate said frequency output signal to have a predetermined frequency responsive to determining said fault.

18. The software product of claim 15 wherein said flow meter software is further configured to direct said processing system to:
receive said instruction over said single output port from a user after a power cycle, wherein said single output port acts as an input/output port for a time period after said power cycle.

19. The software product of claim 15 wherein said flow rate comprises a mass flow rate.

20. The software product of claim 15 wherein said flow rate comprises a volumetric flow rate.

21. The software product of claim 15 wherein said flow rate comprises a net volumetric flow rate.

* * * * *

UNITED STATES PATENT AND TRADEMARK OFFICE
CERTIFICATE OF CORRECTION

PATENT NO.   : 6,782,325 B2
DATED        : August 24, 2004
INVENTOR(S)  : Paul J. Hays and William Michael Mansfield It is certified that error appears in the above-identified patent and that said Letters Patent is hereby corrected as shown below:

Column 2,
Line 33, replace "modem" with -- modern --.

Signed and Sealed this

Twenty-eighth Day of December, 2004

JON W. DUDAS
*Director of the United States Patent and Trademark Office*